United States Patent [19]

Alexander et al.

[11] 3,832,637

[45] Aug. 27, 1974

[54] FSK MODEM

[75] Inventors: Thomas Theron Alexander, Lansdale, Pa.; Alfons Reszka, Northbrook; Charles Keith Stenerson, Park Ridge, both of Ill.

[73] Assignee: Teletype Corporation, Skokie, Ill.

[22] Filed: June 22, 1973

[21] Appl. No.: 372,884

[52] U.S. Cl. .................. 325/30, 178/68, 179/2 DP, 325/163, 332/9 R

[51] Int. Cl. ............................................ H04l 27/10

[58] Field of Search ............... 325/163, 145, 30, 45; 178/66 R, 66 A, 67, 68; 179/2 DP, 2 E; 332/9 R, 9 T, 16 R, 16 T

[56] References Cited

UNITED STATES PATENTS 3,614,624 10/1971 Scarpino ............................ 325/163

3,713,017 1/1973 Vena .................................. 332/9 R 3,715,496 2/1973 Jones, Jr. ............................ 325/30

*Primary Examiner*—Robert L. Griffin

*Assistant Examiner*—Marc E. Bookbinder

*Attorney, Agent, or Firm*—B. W. Sheffield; J. L. Landis

[57] ABSTRACT

A low-speed FSK data modem. A crystal-controlled oscillator drives a ripple-carry binary-counter. The intermediate outputs of the counter are selectively connected to four NAND-gates which decode the four counts which correspond to the four possible FSK output frequencies. Logic means are provided to ensure that the mark-to-space and space-to-mark transitions of the modem output are always graceful.

6 Claims, 9 Drawing Figures

PATENTED AUG 27 1974 3,832,637

SHEET 2 OF 4

FSK MODEM

BACKGROUND OF THE INVENTION

1. Field of the Invention

Broadly speaking, this invention relates to an apparatus for transmitting digital data from a first to a second location. More particularly, in a preferred embodiment, this invention relates to a frequency-shift keying (FSK) data modem which uses a ripple-carry binary counter to generate the necessary FSK frequencies.

2. Discussion of the Prior Art

During the last two decades there has been a dramatic increase in the amount of digital data which is transmitted between remote locations, for example, between a data terminal and a remote, time-sharing computer or between two computers.

Because of its convenience and its almost universal availability, the switched-telephone network is widely employed to transmit this data, especially where cost is a factor and high-speed transmission is not needed.

As is well known, the switched-telephone network, or a leased private line of comparable quality, has a bandwidth of from 300 to 3000 Hz and to transmit digital data to a remote location it is first necessary to modulate one or more carrier frequencies with the digital data, the carrier frequencies being selected so that they fall within the aforesaid 300–3000 Hz telephone-circuit band pass.

While various modulation schemes have been proposed in the past, binary frequency modulation in the form of frequency-shift keying (FSK) is the usual choice where simplicity and economy are more important than bandwidth efficiency. In such systems, the frequency shift in hertz is typically from one-half to three-quarters of the maximum bit rate, and the bandwidth in hertz is nearly equal to twice the maximum bit rate. This permits recovery of the baseband wave without excessive perturbation of the transitions and the system can be operated asynchronously using start-stop codes at any speed up to the maximum capability.

Prior art modulator-demodulators (modems) of this type frequently employed an LC oscillator in which the value of L or C was abruptly switched in accordance with the instantaneous value of the data signal to be transmitted. However, an abrupt change in one of these energy-storing elements can result in amplitude and phase changes which lead to distortion and hence a high-error rate in the received data. While it is possible to devise circuits which abruptly shift the frequency of an oscillator without distortion, such circuits are expensive and difficult to maintain. See, for example, the detailed discussion in *Data Transmission* by W. R. Bennet and James R. Davey, McGraw Hill Book Company, New York, 1965, at page 167.

SUMMARY OF THE INVENTION

It is, thus, an object of this invention to provide an improved data modem which can be used to transmit digital data over the telephone network with a high degree of reliability and at low cost, and which does not suffer from, nor generate, the distortion noted in prior art modems.

To attain this and other objects, and as a solution to the problem outlined above, a first illustrative embodiment of the invention comprises a modulator for use in an apparatus for transmitting digital data from a first to a second location. The modulator comprises means for generating a clock signal having a predetermined frequency, and an m-stage ripple-carry binary-counter connected to, and driven by, the generating means, the binary-counter dividing the clock signal by a factor of $2^m$ and having one pair of intermediate, complementary outputs for each of the $m$ stages in the binary-counter. The modulator includes at least two logic circuits, each having an input connected to the generating means to receive the clock signal and $m$ inputs connected to selected ones of the $2m$ intermediate outputs of the binary-counter. One of the at least two logic circuits has an additional input receiving the data signal which is to be modulated and is conditioned thereby to repetitively decode a first count of the binary-counter, when the data signal is representative of a first binary condition, the logic circuit producing a first output pulse for each first count so decoded. The second one of the logic circuits, in turn, repetitively decodes a second count of the binary counter and produces a second output pulse for each second count so decoded, without regard to the state of said data signal.

The modulator further includes means, connected to the output of the second logic circuit, for inhibiting the second output pulses until such time as the data signal becomes representative of a second binary condition; and means, connected to the outputs of the first logic circuit and the inhibiting means, for generating the desired modulator output, said output comprising a square wave signal having a frequency which is a predetermined sub-multiple of the frequency of either the first output pulses or the second output pulses, as the instantaneous condition of the data signal may dictate.

DETAILED DESCRIPTION OF THE INVENTION

Figure 1:
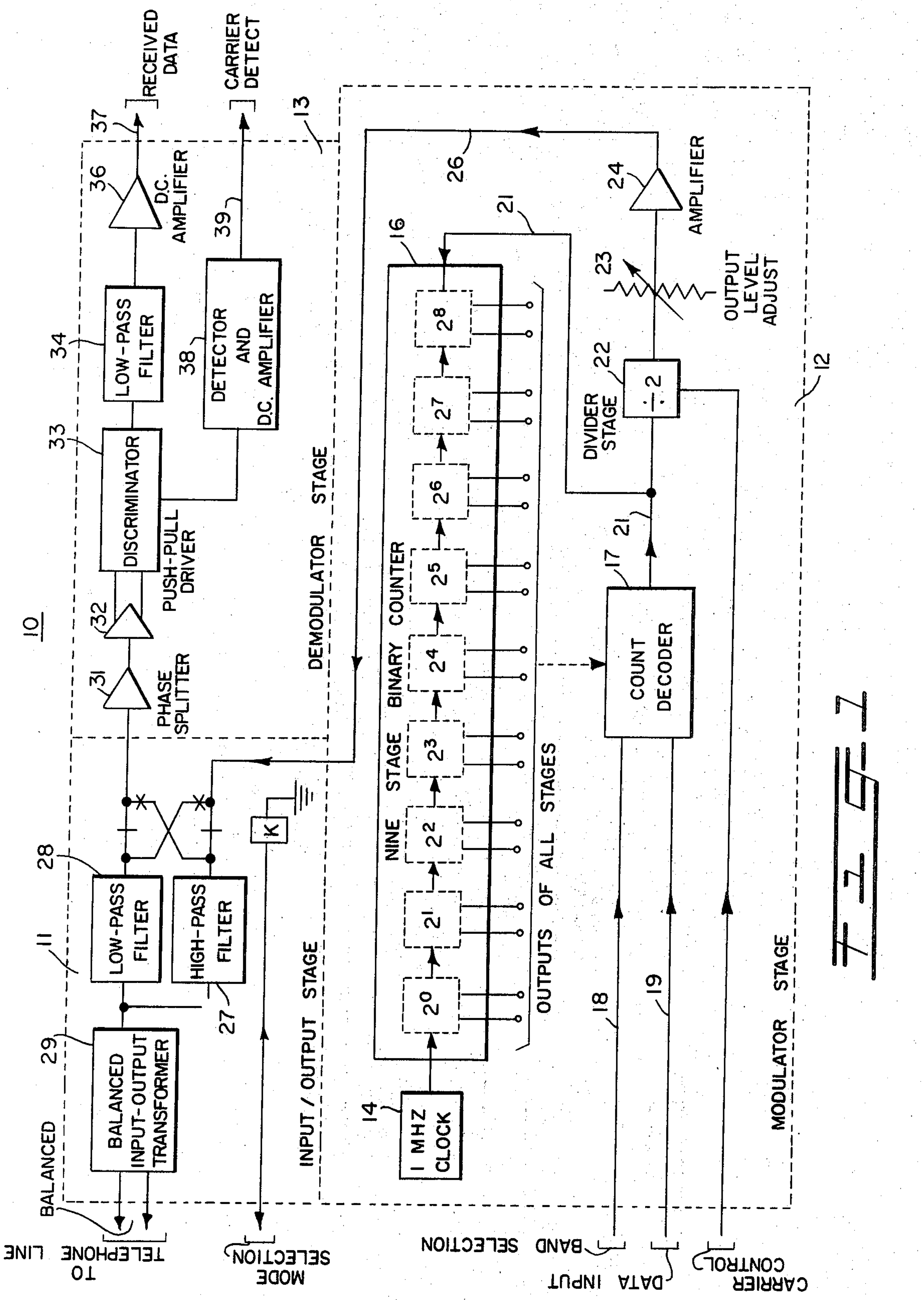
FIG. 1 is a schematic drawing showing the overall layout of an illustrative modem according to this invention.

FIG. 1 depicts in block diagram form the overall layout of the modem according to this invention. A more detailed description of the invention, and its mode of operation, follows this brief introductory section.

The invention will be described below with reference to the established standards for low-speed data modems employing frequency shift keying (FSK), that is, the standards employed in Western Electric 113A and 103E Dataphone datasets, and the like. Thus, if modem 10 is employed to originate a data transmission, the frequencies transmitted to the remote location will be the low-band frequencies of 1070 Hz (space) and 1270 Hz (mark), while the frequencies received from the remote modem will be the high-band frequencies of 2025 Hz (space) and 2225 Hz (mark). Similarly, if modem 10 answers a data call, the frequencies transmitted to the remote location will be the high-band frequencies of 2025 Hz and 2225 Hz, while the frequencies which are received from the distant location will be the low-band frequencies of 1070 Hz and 1270 Hz. One skilled in the art will appreciate that these frequencies are merely illustrative and that, provided appropriate changes are made to the parameters of some of the modem components, the modem will operate satisfactorily with any two different pairs of FSK frequencies which lie within the audio band of approximately 300–3000 Hz, or higher.

As shown in FIG. 1, the modem 10 comprises an input/output stage 11, a modulator stage 12, and a demodulator stage 13. For convenience, and to avoid unduly complicating the disclosure, power supplies are omitted from the drawings as these are entirely conventional and form no part of this invention.

Consider first modulator stage 12 which includes a crystal-controlled clock 14, operating at approximately 1 MHz, which is connected to the input of a nine-stage, ripple-carry, binary-counter 16. Each stage of counter 16 divides the output of the preceding stage by a factor of two, and the intermediate outputs of each of the nine stages are made available for selective connection to the inputs of a count-decoder circuit 17, as will be more fully explained herebelow.

A first control lead 18 is connected to decoder 17 to permit selection of either the high transmission band (2025/2225 Hz) or the low transmission band (1070/1270 Hz), depending upon whether the modem is operating in the "answer" or "originate" mode. The digital data to be transmitted is also applied to decoder 17, via a second control lead 19, to select either the spacing frequency of 1070 (or 2025) Hz or the marking frequency of 1270 (or 2225) Hz, as dictated by the instantaneous state of the data signal to be transmitted.

The output from decoder 17 is a highly asymmetrical rectangular wave at twice the desired output frequency and is connected, via lead 21, to binary-counter 16 to reset the counter after each count has been successfully decoded. The output from decoder 17 is also applied to the input of a divider stage 22 which generates a symmetrical output wave at precisely the desired frequency. A gain control 23 and an amplifier stage 24 are provided so that the user may adjust the output of divider 22 to the desired level which, for telephone transmission, is typically −12 dbm, which is equivalent to a signal level of approximately 200 mV into 600Ω.

The output of amplifier stage 24 is connected, via a lead 26, to input/output stage 11 for transmission to the remote location. More specifically, the modulated audio signals on line 26 are routed by the contacts of a mode selection relay K through either a high-pass filter 27 or a low-pass filter 28, as may be appropriate, thence, via a balanced input/output transformer 29, to the telephone line, or other communication facility, for transmission to a corresponding demodulator stage at the remote terminal.

Incoming data signals from the modulator stage at the remote terminal are fed through either high-pass filter 27 or low-pass filter 28, as may be appropriate, to the input of an amplifier and phase-splitter stage 31 which, in turn, is connected to a push-pull driver stage 32. The output of driver stage 32 is connected to a frequency discriminator 33 which recovers the data signals from the modulated input signals and, after filtering in a low-pass filter 34 and buffering in a d.c. amplifier 36, the recovered data signals are applied, via a lead 37, to any suitable data utilization device (not shown), for example, a teletypewriter or other data terminal. For control purposes, another output from discriminator 33 is connected to a detector and d.c. amplifier stage 38 the output of which, on lead 39, may be used to indicate to the user that data signals are being satisfactorily received from the distant location.

Figure 2:
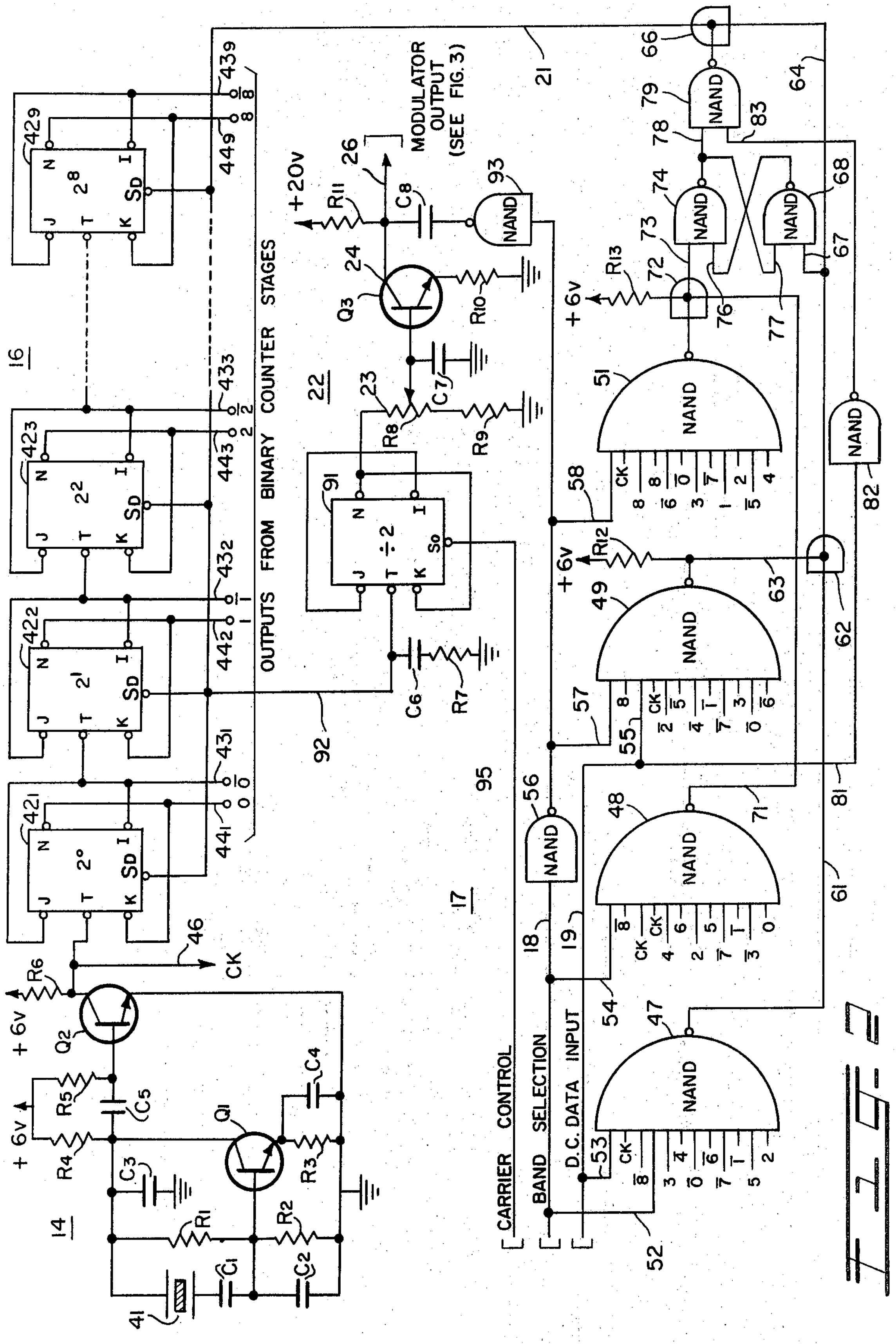
FIG. 2 is a schematic drawing showing the modulator stage of the modem illustrated in FIG. 1 in greater detail.

FIG. 2 depicts modulator stage 12 in greater detail. As shown, clock 14 comprises a conventional Pierce oscillator circuit which includes a quartz crystal 41 connected to the base-collector circuit of a first NPN transistor $Q_1$. For the illustrative embodiment of the invention herein described, crystal 41 has a resonant frequency of 1,000,640 Hz and advantageously maintains an overall frequency tolerance of ±0.005 percent over a 0° to 70°C temperature range. The output of the Pierce oscillator in clock 14 is connected to the base of a second NPN transistor $Q_2$ which acts as a buffer amplifier for the 1 MHz output signal generated by transistor $Q_1$.

As shown, the nine-stage ripple-carry binary counter 16 comprises nine cascaded J-K flip-flop stages $\mathbf{42_1}$ through $\mathbf{42_9}$, and in the modulator as actually constructed, each of said flip-flop stages comprised one-half of a No. 853 DTL integrated circuit.

The J terminal of flip-flop $\mathbf{42_1}$ is connected to the I output of the same flip-flop and also to the trigger input T of the next succeeding flip-flop $\mathbf{42_2}$. A lead $\mathbf{43_1}$ is connected to the I output of flip-flop $\mathbf{42_1}$ to provide the $\overline{0}$ output of the counter. In like fashion, the K terminal of flip-flop $\mathbf{42_1}$ is connected to the N output thereof, and the 0 output of the counter is provided by a lead $\mathbf{44_1}$ which is also connected to the N output of flip-flop $\mathbf{42_1}$. Flip-flops $\mathbf{42_2}$ and $\mathbf{42_3}$, $\mathbf{42_3}$ and $\mathbf{42_4}$, etc. are similarly interconnected, thus, leads $\mathbf{44_2}$, $\mathbf{43_2}$, $\mathbf{44_3}$, $\mathbf{43_3}$, . . . $\mathbf{44_9}$, $\mathbf{43_9}$, respectively, present the 1, $\overline{\mathbf{1}}$, 2, $\overline{\mathbf{2}}$ . . . and 8, $\overline{\mathbf{8}}$ outputs of the counter. Lead 21, which as previously described, carries the reset signal to reset the count in counter 16, is connected in tandem to the reset terminal $S_D$ of each of the nine flip-flop stages $\mathbf{42_1}$ –$\mathbf{42_9}$. The output of clock 16, at the collector of transistor $Q_2$, is connected to the trigger input T of the first flip-flop $\mathbf{42_1}$ and a lead 46, which is also connected to the collector of transistor $Q_2$, provides an output signal CK at the clock frequency.

Decoder stage 17 includes four 12-input NAND-gates 47, 48, 49 and 51 each respectively decoding counts of binary-counter 16 corresponding to twice the marking and spacing frequencies of 1070 Hz, 1270 Hz, 2025 Hz and 2225 Hz.

For example, the count corresponding to 1070 Hz is $$1{,}000{,}064/(2 \times 1070) = 467$$

and $$467_{10} = 111010011_2$$

Thus, inputs of NAND-gate 47 are connected to the $\overline{\mathbf{8}}$, $\overline{\mathbf{7}}$, $\overline{\mathbf{6}}$, 5, $\overline{\mathbf{4}}$, 3, 2, $\overline{\mathbf{1}}$ and $\overline{\mathbf{0}}$ outputs of binary-counter 16.

In addition, inputs are connected to the clock output CK on lead 46 and, via leads 52 and 53, to band-selection lead 18 and data input lead 19, respectively.

In like manner, the count corresponding to 1270 Hz is $$1,000,064/(2 \times 1270) = 394$$

and $$394_{10} = 110001010_2$$

Thus, inputs of NAND-gate 48 are connected to the $\bar{8}$, $\bar{7}$, 6, 5, 4, $\bar{3}$, 2, $\bar{1}$, and 0 outputs of counter 16. An additional input of gate 48 is connected, via a lead 54, to band-selection lead 18, however, no input of gate 48 is connected to the data input lead 19. The remaining two input leads of gate 48 are tied and connected to the clock output CK via lead 46.

For the high band, the count corresponding to 2025 Hz, is $$1,000,064/(2 \times 2025) = 247$$

and $$247_{10} = 011110111_2$$

Thus, inputs of NAND-gate 49 are connected to the 8, $\bar{7}$, $\bar{6}$, $\bar{5}$, $\bar{4}$, 3, $\bar{2}$, $\bar{1}$, and $\bar{0}$ outputs of counter 16. A single-input NAND-gate 56, functioning as an inverter, is connected in line 18 to invert the band-selection signal on line 18. A lead 57 connects this inverted signal to another input of NAND-gate 49 which also receives the data signal on lead 19, via a lead 55, and the clock signal CK from lead 46.

Finally, the count corresponding to 2225 Hz is $$1,000,064/(2 \times 2225) = 225$$

and $$225_{10} = 011100001_2$$

Thus, NAND-gate 51 has inputs connected to the 8, $\bar{7}$, $\bar{6}$, $\bar{5}$, 4, 3, 2, 1 and $\bar{0}$ outputs of counter 16, to the clock output CK on lead 46 and, via a lead 58, to the inverted band-selection signal on lead 18.

The output of NAND-gate 47 is connected, via a lead 61, to one input of a first wired AND-gate 62. The other input of AND-gate 62 is connected, via a lead 63, to the output of NAND-gate 49 and, via a resistor $R_{12}$, to a source of d.c. potential. The output of AND-gate 62 is connected, via a lead 64, to one input of a second wired AND-gate 66, the output of which is connected to the reset line 21, referred to above. The output of AND-gate 62 on lead 64 is also connected to an input 67 of a NAND-gate 68.

The output of NAND-gate 48 is connected, via a lead 71, to one input of a third, wired AND-gate 72. The other input of AND-gate 72 is connected to the output of NAND-gate 51 and, via a resistor $R_{13}$, to a source of d.c. potential. The output of AND-gate 72 is connected to an input 73 of a NAND-gate 74. The other input 76 of NAND-gate 74 is connected to the output of NAND-gate 68 and, in like fashion, the other input 77 of NAND-gate 68 is connected to the output of NAND-gate 74, which is also connected to an input 78 of a NAND-gate 79.

Data lead 19, which is connected to an input of NAND-gate 47 and to an input of NAND-gate 49, is also connected, via a lead 81, to a single input NAND-gate 82 acting as an inverter. The output of NAND-gate 82 is connected to the other input 83 of NAND-gate 79, the output of which is connected as the other input of wired AND-gate 66.

Divider stage 22 comprises a J-K flip-flop 91 having its trigger input connected, via a lead 92, to the reset line 21. Capacitor $C_6$ and resistor $R_7$ are serially connected between line 92 and ground and act as a pulse-stretching circuit. The J terminal of flip-flop 91 is connected to the I output thereof, while the K terminal is connected to the N output thereof. Flip-flop 91 thus acts as a simple divide-by-two stage. Gain control 23, referred to earlier, comprises the series connection of a variable resistor $R_8$ and a fixed resistor $R_9$ which are connected between the N output of flip-flop stage 91 and ground. The movable arm of resistor $R_8$ is connected to the base of a transistor $Q_3$ which, together with bias resistor $R_{10}$ and load resistor $R_{11}$, comprise the amplifying stage 24. A capacitor $C_7$ connects the base of transistor $Q_3$ to ground and, together with resistor $R_8$, acts as a low-pass filter. The output from amplifier stage 24 is taken from the collector of transistor $Q_3$ on line 26 and comprises the FSK audio signals desired. A single-input NAND-gate 93, acting as an inverter, is serially connected with a capacitor $C_8$ to the collector of transistor $Q_3$ to compensate for the slightly higher output from transistor $Q_3$ when the high band is being transmitted.

A carrier-control lead 95 is connected to the reset terminal of flip-flop 91 and when a steady d.c. ground is applied thereto, flip-flop 91 will be totally inhibited. There will, thus, be no modulator output whatsoever. Normally, this condition is required only during the "hand-shaking" procedure with the remote terminal.

The operation of the modulator will now be described in detail. Because the high-band circuitry is substantially identical to the low-band circuitry, only low-band operation will be described in detail. Further, operation of each of the various DTL logic elements will be explained by reference to the state of the device and/or the signal conditions present on the input and output leads thereof. Such signal conditions will be described as being "high" or "low," however, it should be remembered that such terms are relative and the actual voltages used are a function of the particular DTL devices and transistors employed. In the modem actually constructed, the "low" signal condition is equivalent to a voltage of from 0 to +0.3 volts, while the "high" signal condition is equivalent to a voltage of from +3 to +5 volts.

As previously discussed, if modem 10 is employed to originate a data transmission, the frequencies which must be transmitted to the remote location are the low-band frequencies, that is to say, 1070 Hz and 1270 Hz. Transmission of the low-band frequencies is determined when the operator pushes the "Data" button on the telephone instrument associated with the modem (not shown) which action applies, either directly or through a relay, a high signal condition to band-selection lead 18. This high signal condition, in turn, is applied via lead 52 to one input of NAND-gate 47 and, via lead 54, to one input of NAND-gate 48. Thus, both NAND-gates 47 and 48 will be conditioned for operation if, at some subsequent time, all other inputs to one or the other of them simultaneously go high.

NAND-gate 56, however, will invert the high signal condition on lead 18 into a low signal condition, which low signal condition is applied, via lead 57, to one input of NAND-gate 49 and, via lead 58, to one input of NAND-gate 51. Thus, operation of NAND-gates 49 and 51 will be inhibited, regardless of the state of the signals applied to the other inputs thereof.

If modem 10 "answers" an incoming call, however, a low signal condition will be applied to lead 18 and this low signal condition will inhibit NAND-gates 47 and 48. However, the high signal condition which is applied to NAND-gates 49 and 51 will now condition these gates for operation if at some subsequent time all other inputs to one or the other of them simultaneously go high.

The input to the trigger terminal T of flip-flop $42_1$ is a sinusoidal wave having a frequency of 1,000,640 Hz and a period of slightly less than 1,000 nanoseconds. The particular DTL circuit employed for flip-flops $42_1$–$42_9$ is chosen such that flip-flop $42_2$ will toggle only on the negative-going portion of the triggering input wave from clock 14. It will, of course, take a finite time interval, in the order of 20 nanoseconds, for flip-flop $42_1$ to change state and it will, thus, take approximately $9 \times 20 = 180$ nanoseconds for this change to ripple through the counter to the last stage. During the interval in which the change in state of flip-flop $42_1$ is rippling through the counter, it is possible that NAND-gates 47, 48, 49 and 51 might generate erroneous output signals.

In order to prevent this, the clock output CK is also applied as one input to each of NAND-gates 47, 48, 49 and 51, thereby inhibiting any output therefrom until such time as the clock wave goes high, that is, until shortly after the positive-going portion of the clock wave crosses the zero axis, some 500 nanoseconds later. Thus, no count can be decoded by any of the gates in decoder 17 until the count in counter 16 has completely stabilized.

The data signals to be transmitted by modulator 12 are applied to lead 19 as a series of marking and spacing signals. In accordance with established standards, a spacing signal is represented by a high condition on lead 19 and will result in the transmission of a 1070 Hz signal, whereas a marking signal is represented by a low condition on lead 19 and will result in the transmission of a 1270 Hz signal.

Consider first the case where a spacing signal is to be transmitted. The input to NAND-gate 47 on lead 53 will be high due to the spacing signal on lead 19. The input to NAND-gate 47 on lead 52 will also be high, due to the steady low-band transmit signal on lead 18. Thus, when the count in counter 16 has advanced to $467_{10}$ (or $111010011_2$), and the clock pulse has gone high thereby assuring that the count in counter 16 is stable, all inputs to NAND-gate 47 will be simultaneously high and the output on lead 61 will, therefore, go low. Note that NAND-gate 48 has no input connected to data lead 19. Note also that because counter 16 reaches a count of $394_{10}$ (or $110001010_2$) prior to reaching a count of $467_{10}$, the output of NAND-gate 48 will have gone low prior to the output of NAND-gate 47 going low.

However, the high spacing signal on data lead 19 is applied by lead 81 to NAND-gate 82 which inverts it to a low, thereby inhibiting NAND-gate 83 whose output remains high. Since at least one input to NAND-gate 49 is low, the output thereof on lead 63 remains high. Since one input to wired AND-gate 62 is low, the output thereof on lead 64 is low. Also, since one input to wired AND-gate 66 is low, the output on reset lead 21 will also be low.

The low on lead 21 resets each of the flip-flops $42_1$–$42_9$ and the first such flip-flop to toggle will cause the output of NAND-gate 47 to go high, thereby removing the low on leads 61, 64 and 21. Thus, as shown in FIG. 4(*a*), a detected count appears as a very narrow (<100 nS) low-going pulse from a normally high state, the interval between each pulse being 467$\mu$s.

Figure 4:
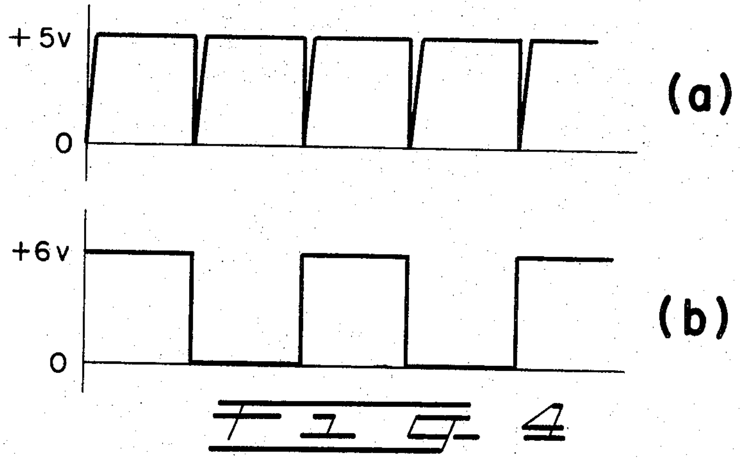
FIGS. 4*a* and *b* depicts some of the waveforms which are observed in the modulator stage of FIG. 2, which waveforms are useful in understanding the operation of the invention.

Each negative-going pulse on lead 92 will trigger flip-flop 91, thus, as shown in FIG. 4(*b*) the output from flip-flop 91 is a symmetrical square wave having a frequency which is half the frequency of the triggering wave or, in the example given, precisely 1070 Hz. As previously mentioned, the duration of each trigger pulse is extremely short (<100 n/sec) therefore, to ensure that flip-flop 91 will be triggered by this short pulse, capacitor $C_6$ and resistor $R_7$ are connected across the trigger input to stretch the input pulse somewhat. Variable resistor $R_8$ may be rotated to adjust the gain of amplifier 24 so that the output from the modem meets the standards established by the telephone company, for example, so that the signal level applied to the line measures −12 dbm.

Capacitor $C_7$ and resistors $R_8$ and $R_9$ act as a crude low-pass filter rolling off the higher harmonics of the square wave shown in FIG. 4(*b*). This wave will be still further filtered in the input/output stage so that when applied to the line, the modem output approximates a sine wave.

Consider now transmission of a steady marking signal. The signal on band-selection lead 18 remains high. Thus, NAND-gates 49 and 51 remain inhibited. The signal on data lead 19, however, will be low since, by definition, this represents a marking signal. The low on lead 19 is applied by lead 53 to NAND-gate 47 thereby inhibiting NAND-gate 47 from decoding the spacing count of 467. However, when the count in counter 16 reaches 394, and clock pulse CK goes high, the output of NAND-gate 48 on lead 71 will go low.

Since at least one of the inputs to wired AND-gate 72 is low, the output thereof, which connects to input 73 of NAND-gate 74, will also be low. Since at least one input of NAND-gate 74 is low, the output thereof, which connects to input 78 of NAND-gate 79, will be high. However, because NAND-gate 82 inverts the low on data lead 81 to a high, input 83 of NAND-gate 79 will also be high, thus the output of NAND-gate 79 will go low. Since at least one input to wired AND-gate 66 is low, the output thereof on reset line 21 will also be low. Thus, counter 16 will be reset, and flip-flop 91 triggered as described above in connection with the steady spacing signal. It will be observed that there is essentially no difference in the way that steady marking and spacing signals are generated, except that, as will be more fully explained below, the marking pulses are routed through some additional logic circuitry (NAND-gates 68, 74, 79).

The above description assumed that the marking and spacing signals on lead 19 were steady signals. Generally speaking, however, the signals on lead 19 will not be steady but will shift back and forth between marking and spacing signals at a relatively rapid rate.

To prevent the demodulator at the remote location from decoding erroneous data signals, it is important that the modulator at the transmitting location be capable of making a graceful transition between a marking and a spacing signal. The asynchronous data signal on lead 19 is, of course, in no way synchronized with the modulator. Thus, a mark-to-space transition can occur at any time, i.e., both prior to, or subsequent to, the time when the count in counter 16 reaches 394.

Figure 5:
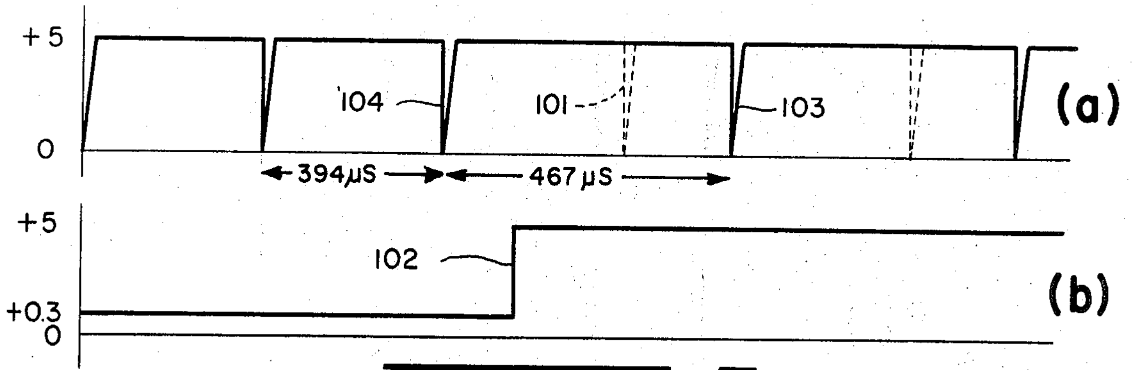
FIGS. 5*a* and *b* depicts the output of the modulator stage shown in FIG. 2 for a given mark-to-space transition in the input wave.

It should be apparent that no special precautions need be taken to ensure that the transition between a marking signal and a spacing signal will be graceful because, as discussed above, the instant that the signal on lead 19 goes from low (mark) to high (space), NAND-gate 47 will be conditioned, via lead 53, to decode the next spacing count from counter 16 and, more importantly, the output of NAND-gate 82 will go low, thereby inhibiting NAND-gate 79 and preventing the low-going pulse from NAND-gate 48, which pulse occurs when the count in counter 16 reaches 394, from reaching the reset lead 21. In other words, as shown in FIG. 5, the negative-going marking pulse 101 next following a mark-to-space transition 102 is suppressed and the next negative-going pulse 103 will be spaced 467$\mu$s from the pulse 104 immediately preceding the mark-space transition 102.

A space-to-mark transition 113, (FIG. 6B) on the other hand, is more troublesome. For example, if the transition occurs after counter 16 has counted to 394, but before the counter has counted to 467, it is possible that the two counts might be tacked together yielding a total count of as much as 861, although since the counter will reset itself at 511 ($111111111_2$) that is probably the maximum count. In any event, it is clear that under either of these circumstances the demodulator at the remote location would become "confused" and might generate erroneous data signals. To avoid this possibility, the modulator according to this invention includes logic means which "remembers" when the count in counter 16 passes the 394 mark and, if a space-to-mark transition is subsequently received, immediately resets the count in counter 16.

Figure 6:
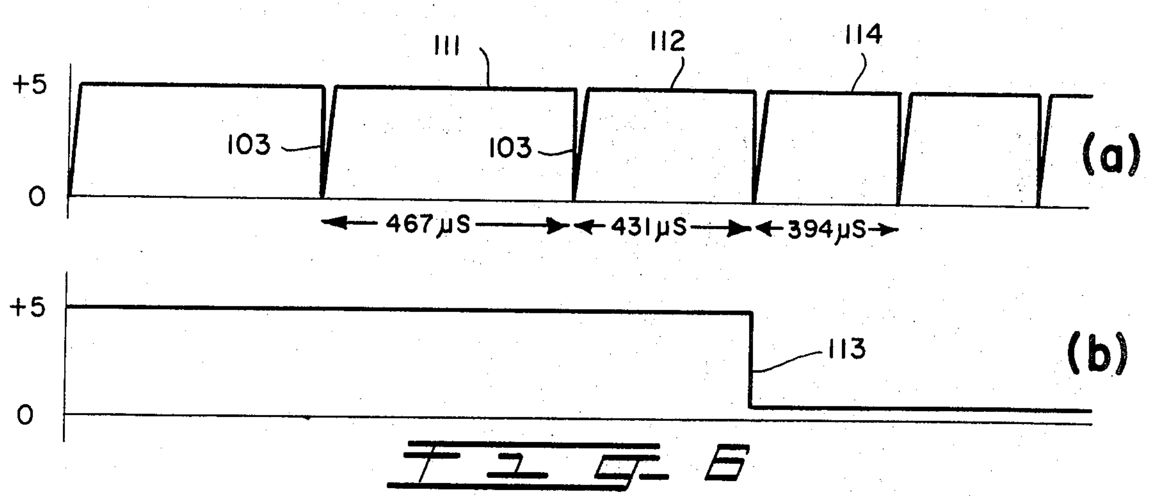
FIGS. 6*a* and *b* depicts the comparable output of the modulator stage for a given space-to-mark transition in the input wave.

Thus, as shown in FIG. 6, the signal on reset line 21 will comprise a train of negative-going pulses 103 uniformly spaced by 467$\mu$s, for example interval 111, for a steady spacing input, a single interval 112 having a random duration of more than 394$\mu$s, but less than 467$\mu$s for a space-to-mark transition 113, and a train of pulses having a uniform spacing of 394$\mu$s, for example interval 114, for a steady spacing input.

It will be recalled that when a steady marking signal is being transmitted and the count in counter 16 reaches 394, the output of NAND-gate 48 goes low. This low is fed to NAND-gate 74 causing the output thereof to go high and the output of NAND-gate 79 to go low. However, the effect of feedback loop 64 has not previously been considered. It will be apparent that the low at the output of NAND-gate 79 will be fed back to input 67 of NAND-gate 68 causing the output thereof to go high, regardless of the fact that: (1) Input 77 of NAND-gate 68 is receiving a high from the output of NAND-gate 74; and (2) Both NAND-gates 47 and 49 are presenting a high to wired AND-gate 62. Now, when counter 16 is reset and any one of the inputs to NAND-gate 48 goes low, the output thereof will go high causing the output of wired AND-gate 72 to go high.

Since both inputs to NAND-gate 74 are now high, the output thereof will go low causing the output of NAND-gate 79 to go high. Since the output of wired AND-gate 62 remains high, input 67 of NAND-gate 68 will go high, but because the other input of NAND-gate 68 receives the low from the output of NAND-gate 74, the output of NAND-gate 68 will remain high.

Assume now that the signal on lead 19 is high and that a steady train of spacing pulses, spaced apart by 467$\mu$s, are to be transmitted. After each resetting of counter 16, and before the count in counter 16 reaches 394, the state of NAND-gates 74, 68 and 79 will be as above-described, i.e., gates 79 and 68 will be high, while gate 74 will be low. However, when the count on counter 16 reaches 394, the output of NAND-gate 48 will go low, and this in turn, will cause the input 73 of gate 74 to go low and the output thereof go high. This high is then applied to input 77 of NAND-gate 68 and since input 67 is already high, the output thereof will go low. Because the output of NAND-gate 68 is connected to input 76 of NAND-gate 74, the output of NAND-gate 74 is locked in the high condition, and thus, the fact that the count in counter 16 has exceeded 394 is "remembered" by NAND-gates 68 and 74.

Now, referring to FIG. 6, if a space-to-mark transition 113 occurs when the count on counter 16 is 431, say, and the signal on lead 19 goes low, input 83 of NAND-gate 79 will go high. But, since the "remembered" condition in NAND-gate 74 also presents a high to input 78 of NAND-gate 79, the output thereof will go low, immediately resetting the count in counter 16. Thus, reset lead 21 will begin to receive a steady train of pulses 114 separated by 394$\mu$s rather than the steady train of pulses 111 separated by 467$\mu$s. Only one pulse interval 112 will be generated having a non-standard duration, 431$\mu$s in the example given, and since this interval lies between 467$\mu$s and 394$\mu$s, there will be no significant disturbance of the decoding capabilities of the demodulator at the remote location.

Figure 3:
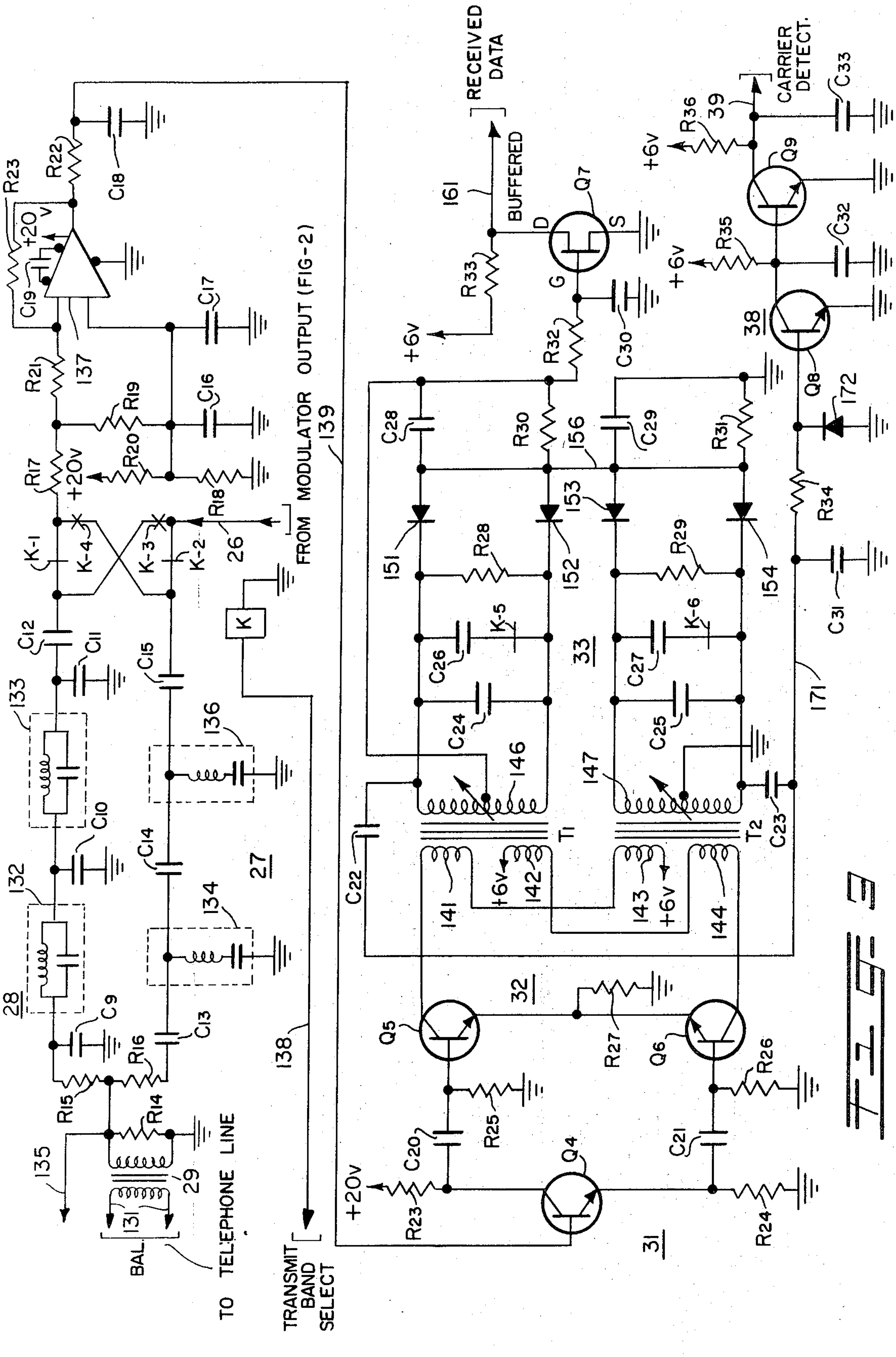
FIG. 3 is a schematic drawing showing the input/output stage and the demodulator stage of the modem illustrated in FIG. 1 in greater detail.

FIG. 3 depicts input/output stage 11 and demodulator stage 12 in greater detail. As shown, a balanced telephone line 131, which may be connected via a private line or the switched telephone network to the remote location, is wired to the input of a balanced input/output transformer 29, in the conventional manner. The output of transformer 29 is connected, via a resistor $R_{15}$, to a shunt, M-derived low-pass filter 28 comprising two pi-section filter elements 132 and 133. In like manner, the secondary of transformer 29 is connected, via a resistor $R_{16}$, to a series, M-derived high-pass filter 27 comprising two T-section filter elements 134 and 136. A lead 135 is provided so that an unbalanced input source, such as a coaxial cable, may be directly connected to the low-pass filter, and high-pass filter, if desired.

The output of low-pass filter 28 is connected, via the normally closed contacts K-1 of a relay K, to the input of a linear, integrated circuit, operational amplifier 137 or, via normally open relay contacts K-3, to the output of modulator 12 on lead 26. In like manner, the output of high-pass filter 27 is connected, via normally closed relay contacts K-2, to the output of modulator 12 on lead 26 or, via normally open relay contacts K-4, to the input of amplifier 137. Amplifier 137 provides essentially all of the gain of the demodulator, as well as limiting the amplitude of the data signals received from the remote location. Typically, the amplitude of these signals will range from a minimum of about −50 dbm (approximately 2.4 mV) up to a theoretical (but not probable maximum of −12 dbm (approximately 200 mV).

If the modem is originating a data transmission and, hence, transmitting data in the low-band and receiving data in the high-band, relay K will be operated by the application of a d.c. potential to a relay control lead 138 by conventional means (not shown), which means may be associated with the "data" push-button discussed earlier in connection with the means for applying the band-selection signal to lead 18 in FIG. 1.

Relay K operated connects the output of modulator 12 to telephone line 131 via low-pass filter 28. In like manner, with relay K operated, incoming data signals from the remote location are connected to amplifier 137 via high-pass filter 27.

When connected in the transmission path, low-pass filter 28 further attenuates any second and higher harmonics which may be present in the already partially filtered square wave output from modulator 12. High-pass filter 27, on the other hand, attenuates any low frequency noise which may be present on the telephone line and, importantly, prevents the relatively high level output from modulator 12 from overloading the input to amplifier 137. Of course, when modem 10 receives a data transmission, relay K is unoperated and the roles of the high and low-pass filters are reversed. That is to say, low-pass filter 28 effectively suppresses any high frequency noise which may be present on the telephone line, while high-pass filter 27 helps to shape the output from modulator 12, although not as effectively as does low-pass filter 28.

The output of amplifier 137 is connected, via a lead 139, to phase splitter 31, more specifically, to the base of a NPN transistor $Q_4$ having resistors $R_{23}$ and $P_{24}$, respectively connected in the collector and emitter circuits thereof.

A pair of NPN transistors $Q_5$ and $Q_6$ form a class B push-pull driver stage 32 and the base of transistor $Q_5$ is connected, via a capacitor $C_{20}$, to the collector of transistor $Q_4$. The base of transistor $Q_6$ is similarly connected, via a capacitor $C_{21}$, to the emitter of transistor $Q_4$.

The discriminator stage 33 includes a pair of transformers $T_1$ and $T_2$ each respectively having a pair of series-aiding primary windings, 141, 142 and 143, 144, and a center-tapped secondary winding 146 and 147. The collector of transistor $Q_5$ is serially connected to winding 141 of transistor $T_1$ and winding 143 of transformer $T_2$, thence to a source of positive potential (not shown). In like manner, the collector of transistor $Q_6$ is serially connected to winding 144 of transformer $T_2$ and winding 142 of transformer $T_1$, thence to a source of positive potential (not shown).

Transformer $T_1$ is tuned by a capacitor $C_{24}$ which is connected across the secondary winding 146 thereof to form a conventional tank circuit. An additional capacitor $C_{26}$, which is wired through normally closed relay contacts K-5, is connected in parallel with capacitor $C_{24}$. The a.c. voltage developed across the resonant tank circuit is full-wave rectified by a pair of diodes 151 and 152 whose cathodes are connected to a load resistor $R_{30}$ . A capacitor $C_{28}$, which is connected in parallel with resistor $R_{30}$, smoothes the rectified a.c. into a steady d.c. signal.

The secondary winding 147 of transformer $T_2$ is similarly tuned by capacitors $C_{25}$ and $C_{27}$ and the output therefrom is full-wave rectified by a second pair of diodes 153 and 154. A resistor $R_{31}$ forms the load for the rectified output of transformer $T_2$ and a capacitor $C_{29}$, connected in parallel with resistor $R_{31}$, smoothes the rectified d.c. A lead 156 connects the smoothed output of transformer $T_2$, which is developed across load resistor $R_{31}$, to the juncture of load resistor $R_{30}$ and the cathodes of diodes 151 and 152 associated with transformer $T_1$.

The other end of resistor $R_{31}$ is grounded while the other end of resistor $R_{30}$ is connected, via a low-pass filter comprising a resistor $R_{31}$ and a capacitor $C_{30}$, to the gate of an FET amplifier $Q_7$. The signal at the gate of FET $Q_7$ is thus the algebraic sum of the potentials developed across load resistors $R_{30}$ and $R_{31}$ and will be positive if the voltage developed across transformer $T_1$ is greater than the voltage developed across transformer $T_2$ and negative if the voltage developed across transformer $T_2$ is greater than the voltage developed across transformer $T_1$. As previously mentioned, when originating a data transmission the signals received from the remote location will be in the high-band and relay K will be operated. Thus, capacitor $C_{24}$ alone will tune transformer $T_1$ and capacitor $C_{25}$ alone will tune transformer $T_2$.

Advantageously, transformer $T_1$ is resonated at a frequency somewhat higher than the marking frequency of 2225 Hz while transformer $T_2$ is resonated somewhat below the spacing frequency of 2025 Hz so that a conventional S-shaped discriminator curve is obtained.

When modem 10 "answers" a data transmission, the incoming data signals from the remote location will be in the low-band and relay K will be unoperated. The additional capacitance added by capacitors $C_{26}$ and $C_{27}$ will lower the resonant frequencies of transformers $T_1$ and $T_2$ such that transformer $T_1$ will now resonate just above the low-band marking frequency of 1270 Hz, while transformer $T_2$ will now resonate just below the low-band spacing frequency of 1070 Hz.

As previously discussed, it is advantageous to provide some means to indicate to an operator that carrier signals are indeed being received from the remote location. To that end, demodulator 33 includes a detector and d.c. amplifier stage 38 which develops an output signal on lead 39 when either the marking or the spacing signal is being received from the remote location. This signal may be used, for example, to light an indicating lamp on or near the data terminal. As long as this lamp remains lit, the operator knows that he is connected to the remote terminal and whatever data he is transmitting is being received at the remote location.

More specifically, a small fraction of the a.c. potential developed across the tuned secondaries of transformer $T_1$ and $T_2$ is tapped-off by a pair of capacitors $C_{22}$ and $C_{23}$, respectively, which are connected by a lead 171 to the base of an NPN transistor $Q_8$. This a.c. potential is rectified by the base-emitter junction of transistor $Q_8$ assisted by a shunt diode 172. The potential developed across a load resistor $R_{35}$ in the collector of transistor $Q_8$ is connected to the base of an NPN transistor $Q_9$ which amplifies and inverts the d.c. signal applied to its base. Thus, the carrier-detect signal on lead 39 will be high whenever adequate carrier signals are being received from the remote location (> −55 to −45 dbm) and low when no carrier, or a carrier which is lower than −55 dbm, is received.

In operation, assume that modem 10 is operating in the "answer" mode and that a steady 1070 Hz spacing signal is being received from the remote location. Because transformer $T_2$ is resonant just below 1070 Hz, there will be a large negative potential developed across load resistor $R_{31}$.

Although no marking signal is being transmitted from the remote location, a small positive potential will nevertheless be developed across load resistor $R_{30}$ due to crosstalk, noise on the line, etc. However, the algebraic sum of the two output voltages will be strongly negative and this negative voltage will cut-off FET $Q_7$ causing the demodulator output on lead 161, which is developed across drain load resistor $R_{33}$, to go high. Conversely, when a steady marking signal is received from the remote location, the large positive potential applied to the gate of FET $Q_7$ will saturate the same, causing the output voltage developed across resistor $R_{33}$ to go low.

Operation of the demodulator for the high-band is essentially similar and will not be discussed.

One skilled in the art will appreciate that various modifications and substitutions may be made to the circuitry disclosed without departing from the spirit and scope of the invention.

What is claimed is:

1. In an apparatus for transmitting digital data from a first to a second location, a modulator which comprises:

means for generating a clock signal having a predetermined frequency;

an m-stage ripple-carry binary-counter connected to and driven by, said generating means, said counter dividing the clock signal by a factor of $2^m$ and having one pair of intermediate, complementary outputs for each of said $m$ stages;

at least two logic circuits, each having an input connected to said generating means to receive said clock signal and $m$ inputs connected to selected ones of the $2m$ intermediate outputs of said binary-counter, a first one of said logic circuits having an additional input receiving the data signal which is to be modulated and being conditioned thereby to repetitively decode a first count of said binary-counter, when said data signal is representative of a first binary condition, said logic circuit producing a first output pulse for each first count so decoded, the second one of said logic circuits repetitively decoding a second count of said binary-counter and producing a second output pulse for each second count so decoded, without regard to the state of said data signal;

means, connected to the output of said second logic circuit, for inhibiting said second output pulses until such time as said data signal becomes representative of a second binary condition; and means, connected to the outputs of said first logic circuit and said inhibiting means, for generating the desired modulator output, said output comprising a square wave signal having a frequency which is a predetermined submultiple of the frequency of either said first output pulses or said second output pulses, as the instantaneous condition of the data signal may dictate.

2. The apparatus according to claim 1 wherein said first count is larger than said second count and the apparatus further comprises:

means for resetting the count in said binary-counter after generation of each first or second output pulse, as the instantaneous condition of the data signal may dictate; and memory means, interposed between the output of said second logic circuit and said inhibiting means, for memorizing the fact that the count in said counter has exceeded said second count, said memory means immediately actuating said resetting means if said data signal is subsequently changed from said first binary condition to said second binary condition after the count in said counter exceeds said second count, whereby one half-cycle only of said square-wave modulator output will have a duration greater than or equal to the spacing between successive second output pulses but less than or equal to the spacing between successive first output pulses.

3. The apparatus according to claim 2 wherein:

said clock generating means comprises a crystal-controlled oscillator;

said first and second logic circuits each comprise a logical NAND-gate;

said inhibiting means comprises a logical NAND-gate having one input connected through an inverting stage to the source of said data signals and another input connected to the output of said memory means;

said memory means comprises a pair of logical NAND-gates interconnected as a bistable multivibrator, said multivibrator having one tirgger input connected to the output of said first logic circuit and the other trigger input connected to the output of the second logic circuit; and a feedback loop interconnecting the output of said inhibiting NAND-gate and the trigger input of said multivibrator which connects to the output of said first logic circuit.

4. The apparatus according to claim 1 further including:

means for supplying a band-selection signal, said first and second logic circuits each having an additional input connected thereto and being enabled for respectively decoding first and second counts in said decoder when said band-selection signal represents a first binary condition;

means for inverting said band-selection signal so that when said signal is representative of a second binary signal and said first and second logic circuits are inhibited from decoding counts of said counter, the output of said inverter is an enabling signal representative of said first binary condition;

third and fourth logic circuits, each having an input connected to said generating means to receive said clock signal, $m$ inputs connected to different selected ones of the $2m$ intermediate outputs of said binary-counter, and an input connected to the output of said band-selection signal inverting means, the third logic circuit having an additional input receiving the data signal which is to be modulated and being conditioned thereby to repetitively decode a third count of said binary-counter when said data signal is representative of a first binary condition, said logic circuit producing a third output pulse for each third count so decoded, the fourth logic circuit repetitively decoding a fourth count of said binary-counter and producing a fourth output pulse for each fourth count so decoded, without regard to the state of the data signal;

means for connecting the outputs of said first and third logic circuits in tandem; and means for connecting the outputs of said second and fourth logic circuits in tandem.

5. In combination with the modulator according to claim 1, and a communications transmission line connecting said modulator to the second location, said transmission line having a given impedance, an input/output stage which comprises:

impedance matching means for matching the impedance of said transmission line to the impedance of said modulator;

an electrically symmetrical high-pass filter connected to said impedance matching means;

an electrically symmetrical low-pass filter connected to said impedance matching means;

a gain-limiting amplifier; and means for selectively connecting said high-pass filter to the input of said gain-limiting amplifier and said low-pass filter to the modulator output generating means or for selectively connected said low-pass filter to the input of said gain-limiting amplifier and said high-pass filter to the modulator output generating means.

6. In combination with the modulator and input/output stage according to claim 5, a demodulator which comprises:

phase-splitting means connected to the output of said gain-limiting amplifier;

a push-pull amplifying stage connected to said phase-splitting means;

first and second tuned discriminator transformers each connected to both outputs of said push-pull amplifying stage;

means, operatively coupled with said selective connecting means, for producing a discrete change in the resonant frequency of said first and second tuned discriminator transformers;

first and second rectifying means respectively associated with said first and second tuned discriminator transformers;

summing means for taking the algebraic sum of the rectified outputs of said first and second rectifying means; and a buffer connected to the output of said summing means for producing an output signal having a first binary condition if the output from said summing means is positive and a second binary condition if the output from said summing means is negative.

* * * * *